US012654962B2

(12) United States Patent
Oppolzer et al.

(10) Patent No.: US 12,654,962 B2
(45) Date of Patent: Jun. 16, 2026

(54) METHODS AND SYSTEMS FOR MINING

(71) Applicant: TECHNOLOGICAL RESOURCES PTY. LIMITED, Melbourne (AU)

(72) Inventors: Florian Andreas Oppolzer, Melbourne (AU); Anne Kathryn Brown, Melbourne (AU); Peter Siew Hun Mah, Melbourne (AU)

(73) Assignee: TECHNOLOGICAL RESOURCES PTY. LIMITED, Melbourne (AU)

( * ) Notice: Subject to any disclaimer, the term of this patent is extended or adjusted under 35 U.S.C. 154(b) by 16 days.

(21) Appl. No.: 18/685,963

(22) PCT Filed: Aug. 25, 2022

(86) PCT No.: PCT/AU2022/051018
§ 371 (c)(1),
(2) Date: Feb. 23, 2024

(87) PCT Pub. No.: WO2023/023790
PCT Pub. Date: Mar. 2, 2023

(65) Prior Publication Data
US 2025/0188839 A1      Jun. 12, 2025

(30) Foreign Application Priority Data

Aug. 25, 2021    (AU) ................................ 2021221760
Aug. 25, 2021    (AU) ................................ 2021221812
(Continued)

(51) Int. Cl.
*B65G 67/04* (2006.01)
*B65G 1/04* (2006.01)
(Continued)

(52) U.S. Cl.
CPC ........... *B65G 67/04* (2013.01); *B65G 63/008* (2013.01); *E02F 9/205* (2013.01); *E02F 9/2054* (2013.01);
(Continued)

(58) Field of Classification Search
CPC .......... G05D 1/667; E21C 35/20; E21C 47/00
See application file for complete search history.

(56) References Cited

U.S. PATENT DOCUMENTS 4,831,539 A * 5/1989 Hagenbuch ............ G07C 5/085
177/136
6,363,632 B1 4/2002 Stentz et al.
(Continued)

FOREIGN PATENT DOCUMENTS

AU      2012101524 A4    11/2012
AU      2016250439 A1     5/2017
(Continued)

OTHER PUBLICATIONS

May 20, 2022—(AU) Preliminary search and opinion for patent application—App 2021221760.
(Continued)

*Primary Examiner* — Jong-Suk (James) Lee
(74) *Attorney, Agent, or Firm* — Banner & Witcoff, Ltd.

(57) ABSTRACT

Methods and systems for mining described herein include a surface mine site including a processing site situated remotely from a blast site within the mine site and coupled by a network of roads. A first proportion of the roads are sealed and a second proportion of the roads have a maximum width in the range of 3 to 12 metres. A fleet of autonomous material handling units are located at the surface mine site, each autonomous material handling unit including a wireless transceiver for coupling to a communications network. The autonomous material handling units include a plurality of
(Continued)

small capacity haulage vehicles, each having a maximum payload capacity of 80 tonnes or less. The autonomous material handling units are configured to be controlled by a control centre via the communications network.

20 Claims, 3 Drawing Sheets

(30) Foreign Application Priority Data

| | | |
|---|---|---|
| Aug. 25, 2021 | (AU) | ................................. 2021221826 |
| Aug. 25, 2021 | (AU) | ................................. 2021221840 |

(51) Int. Cl.

| | |
|---|---|
| B65G 63/00 | (2006.01) |
| E02F 9/20 | (2006.01) |
| E02F 9/26 | (2006.01) |
| E21C 35/00 | (2006.01) |
| E21C 41/26 | (2006.01) |
| G06Q 10/087 | (2023.01) |

(52) U.S. Cl.

CPC .............. *E02F 9/261* (2013.01); *E02F 9/262* (2013.01); *E02F 9/265* (2013.01); *E21C 35/282* (2023.05); *E21C 41/26* (2013.01); *G06Q 10/087* (2013.01); *B65G 1/0457* (2013.01); *B65G 1/0492* (2013.01); *B65G 2201/0235* (2013.01); *B65G 2201/045* (2013.01); *B65G 2203/0208* (2013.01); *B65G 2203/0216* (2013.01); *B65G 2203/042* (2013.01)

(56) References Cited

U.S. PATENT DOCUMENTS

| | | | | |
|---|---|---|---|---|
| 9,847,026 | B2 * | 12/2017 | Adams | .................... G08G 1/127 |
| 11,407,455 | B2 * | 8/2022 | Patnaik | ........... B60W 30/18109 |
| 11,535,143 | B2 * | 12/2022 | Krishnamurthi | ..... G07C 5/0808 |
| 2004/0040792 | A1 * | 3/2004 | Uranaka | .................. E21F 13/00 |
| | | | | 187/382 |
| 2006/0090379 | A1 * | 5/2006 | Furem | ..................... E02F 9/262 |
| | | | | 37/443 |
| 2008/0213073 | A1 | 9/2008 | Benedict et al. | |
| 2013/0036711 | A1 | 2/2013 | Scudder et al. | |
| 2013/0206415 | A1 | 8/2013 | Sheesley | |
| 2013/0272829 | A1 | 10/2013 | Innes et al. | |
| 2014/0010603 | A1 | 1/2014 | Blais et al. | |
| 2014/0083554 | A1 | 3/2014 | Harris | |
| 2015/0368052 | A1 | 12/2015 | Sheesley | |
| 2016/0016202 | A1 | 1/2016 | Bamber et al. | |
| 2016/0137404 | A1 | 5/2016 | Steiner | |
| 2017/0017239 | A1 * | 1/2017 | Kanai | ................... G05D 1/0055 |
| 2017/0032302 | A1 | 2/2017 | Lete et al. | |
| 2017/0121945 | A1 | 5/2017 | Bamber et al. | |
| 2017/0247860 | A1 | 8/2017 | Lehtinen et al. | |
| 2018/0173221 | A1 | 6/2018 | Samaraweera | |
| 2018/0305141 | A1 | 10/2018 | Markham | |
| 2019/0219681 | A1 | 7/2019 | Atsushi et al. | |
| 2020/0104790 | A1 | 4/2020 | Chung | |
| 2020/0140197 | A1 | 5/2020 | Yan | |
| 2020/0173795 | A1 * | 6/2020 | Hardee | .............. G01C 21/3438 |
| 2020/0356942 | A1 * | 11/2020 | Boudreau | .............. G06Q 30/06 |
| 2020/0401141 | A1 | 12/2020 | Vitale et al. | |
| 2021/0132610 | A1 | 5/2021 | Wu | |
| 2021/0198866 | A1 | 7/2021 | Liu et al. | |
| 2023/0052077 | A1 | 2/2023 | Maeda et al. | |
| 2024/0353856 | A1 * | 10/2024 | Oppolzer | ............... E21F 13/00 |

FOREIGN PATENT DOCUMENTS

| | | | | | |
|---|---|---|---|---|---|
| AU | 2020274212 | A1 * | 11/2021 | ............. | E02F 9/205 |
| EP | 2141414 | A1 | 1/2010 | | |
| EP | 3415390 | A1 | 12/2018 | | |
| EP | 3839203 | A1 | 6/2021 | | |
| JP | 2018-142113 | A | 9/2018 | | |
| WO | 2013001364 | A2 | 1/2013 | | |
| WO | 2014176640 | A1 | 11/2014 | | |
| WO | WO-2018132904 | A1 * | 7/2018 | ......... | G06Q 10/0631 |
| WO | 2020079648 | A1 | 4/2020 | | |
| WO | 2020120957 | A2 | 6/2020 | | |
| WO | 2020156635 | A1 | 8/2020 | | |
| WO | WO-2021102333 | A1 * | 5/2021 | ............. | G05D 1/646 |
| WO | WO-2023078866 | A1 * | 5/2023 | ............. | E02F 9/205 |

OTHER PUBLICATIONS

ISG Brochure 2019/2020 Edition [retrieved from internet May 18, 2022].

Dec. 9, 2021—(AU) Preliminary search and opinion for patent application—App 2021221760.

Dec. 13, 2021—(AU) Preliminary search and opinion for patent application—App 2021221812.

Knights, Peter and Franklin, Dennis, "Autonomous Surface Mining Equipment: Is Bigger Better?", 2010, pp. 1-8.

Owens, Race, "Adapting Open Pit Mine Design Fundamentals to Leverage the Advantages of Autonomous Haulage Systems", Montana Tech, Graduate Theses & Non-Theses, published Aug. 12, 2021, 46 pages.

Redwood, Nick, "Autonomous Haulage Systems Financial Model Assessment", Whittle Consulting for Mining Technicians Group—Australia, Feb. 14, 2018, 28 pages.

Rupprecht, S.M., "Surface Haul Road Design Considerations in Mine Planning," Mine Planning Colloquium 2019, May 22-23, 2019 Johannesburg, South Africa, The Southern African Institutue of Mining and Metallurgy, 11 pages.

Dec. 2, 2022—(WO) International Search Report for PCT/AU2022/051026.

Nov. 26, 2021—(AU) Preliminary search and opinion for patent application—App 2021221826.

Nov. 24, 2021—(AU) Preliminary search and opinion for patent application—App 2021221840.

Ercelebi, S.G. and Bascetin, A., "Optimization of shovel-truck system for surface mining," The Journal of the Southern African Institute of Mining and Metallurgy, vol. 109, Jul. 2009, pp. 433-439.

Zeng, Weiguo, "A similuation model for truck-shovel operation," University of Wollongong Thesis Collection, 2018, 307 pages.

Dec. 8, 2023—(WO) International Preliminary Report on Patentability—App PCT/AU2022/051026.

Dec. 2, 2022—(WO) Written Opinion of the International Search Authority—App PCT/AU2022/051026.

Aug. 30, 2023—(WO) Written Opinion of the International Preliminary Examining Authority—App PCT/AU2022/051026.

Dec. 8, 2023—(WO) International Preliminary Report on Patentability—App PCT/AU2022/051017.

Dec. 12, 2022—(WO) International Search Report—App PCT/AU2022/051017.

Nov. 25, 2022—(WO) International Search Report PCT/AU2022/051018.

Nov. 25, 2022—(WO) Written Opinion of the International Searching Authority—App PCT/AU2022/051018.

Nov. 23, 2022—(WO) International Search Report—App PCT/AU2022/051032.

Dec. 7, 2023—(WO) International Preliminary Report on Patentability—App PCT/AU2022/051032.

Bozorgebrahimi, Enayatollah, "The Evaluation of Haulage Truck Size Effects on Open Pit Mining," Doctoral Thesis for The University of British Columbia, 2004, 177 pages.

Jan. 16, 2026—(US) Office Action—U.S. Appl. No. 18/585,153.

* cited by examiner

346

340

__300__

338

Communications
Network

342

344

324

310

320

322

I/O
Interface(s)

312

Processor

348

314

Memory

I/O
Port(s)

330

332

316

336

METHODS AND SYSTEMS FOR MINING

RELATED APPLICATIONS

The present application claims priority from and is a U.S. National Phase of International Application No. PCT/AU2022/051018, which was filed on Aug. 25, 2022 designating the United States of America and claiming priority to Australian Patent Application No. 2021221760, filed Aug. 25, 2021; Australian Patent Application No. 2021221812, filed Aug. 25, 2021; Australian Patent Application No. 2021221826, filed Aug. 25, 2021; and Australian Patent Application No. 2021221840, filed Aug. 25, 2021; the entire contents of which prior applications are incorporated herein by reference in their entireties. The present application is also related to the following co-pending international patent applications, each of which was filed on Aug. 25, 2022: International Application No. PCT/AU2022/051032 (published as WO 2023/023804 A1); International Application No. PCT/AU2022/051026 (published as WO 2023/023798 A1); and International Application No. PCT/AU2022/051017 (published as WO 2023/023789 A1), each of which applications is hereby incorporated by reference in its entirety.

TECHNICAL FIELD

The present disclosure relates to methods and systems for mining. In particular, the present disclosure relates to methods and systems for mining based on the use of relatively small haulage vehicles rather than ultra-class haul trucks. Such relatively small haulage vehicles may be autonomous vehicles, but the methods and systems described herein are not limited thereto.

BACKGROUND

Surface mines extract ore by blasting areas of rock. Each area that is to be blasted is called a bench. Benches are generally level, horizontal areas. For large mines, benches may be in the range of 10 to 15 metres high. Mining may be conducted contemporaneously on a number of benches within a mine, with different benches and other areas of the mine connected by a series of roads and ramps.

In order to blast a bench, a mining engineer, also referred to as a drill and blast engineer, designs a blast for that bench. The designed blast takes into account many factors, including, but not limited to, access to the bench, the geology of the rock to be blasted, the drill rigs available for use, and type and quantity of explosives to be used. The mining engineer designs a drilling plan, also known as a drill pattern, which identifies the hole locations, hole sizes, and hole depths of the blast holes that are to be drilled by the drill rigs.

Once approved by the drill and blast engineer, the drilling plan is typically printed and handed to a team of drill operators assigned to an area of the bench to work on. In more recent times, the drilling plan is made available to the team of drill operators through electronic means. It is common for two or three operator-controlled drill rigs to work contemporaneously on the same bench. The drill operators generally divide the bench area among themselves and then drill the holes in accordance with the drilling plan.

Once the drill rigs have drilled the holes, the holes are then filled with explosives by an explosives team and the explosives are detonated. The amount and type of explosive used for each blast is decided by the drill and blast engineer.

The rubble produced by the blast is then collected by shovels and loaded into a fleet of dump trucks, which remove the rubble from the blast site to a processing plant. The rubble is a mixture of overburden and ore and the processing plant separates the ore from the overburden.

As the blasted material is large and heavy, the shovels and dump trucks used to collect and move blasted material around a mine site are typically extremely large machines that are custom-made for mining purpose and manufactured in very low numbers. Such extremely large machines are operated by specialist operators who have undertaken extensive training.

The size and weight of such extremely large machines dictates that the gradients of access roads and ramps into the mine must be quite shallow. For example, surface mining haulage trucks can be up to 15 m long and almost 10 m wide, weighing up to 650 tonnes when fully laden. These surface mining haulage trucks fall within the category of "ultra-class haul trucks", being trucks that are capable of hauling payloads of around 270 tonnes or more. Ultra-class haulage trucks require approximately 15 m of road width to operate safely in a single direction and consequently ultra-class haulage trucks may require roads of around 30 m-40 m wide or more to enable trucks travelling in opposite directions to pass safely. Such massive haulage trucks can only operate on haul roads having gradients of less than 10%, and preferably less than 7% to minimise wear and tear on the engines. Such shallow gradients result in roads that are long and wide, which influences the size and shapes of benches that can be blasted within a mine site. Long, wide roads also require more excavation and construction to prepare and result in longer travel times.

The access roads must be able to withstand the weight of such vehicles, generally precluding the use of conventional sealed roads. Consequently, the access roads are generally unsealed roads that are frequently damaged by the passage of extremely heavy machines. In order for the roads to remain operational, the unsealed roads require frequent grading and watering. During the grading and watering processes, the roads are unpassable, delaying the mining operations of that site.

A need exists to provide an improved method and system for mining.

SUMMARY

The present disclosure relates to methods and systems for mining that utilise autonomous vehicles.

A first aspect of the present disclosure provides a mining operation or system comprising:
  a surface mine site;
  a fleet of autonomous material handling units located at said surface mine site, each autonomous material handling unit including a wireless transceiver for coupling to a communications network, wherein said autonomous material handling units include a plurality of small capacity haulage vehicles, and
  further wherein said autonomous material handling units are configured to be controlled by control commands transmitted from a control centre via said communications network.

In some embodiments, the surface mine site includes a processing site situated remotely from a blast site within said mine site, said processing site and said blast site being coupled by a network of roads, wherein a first proportion of said roads are sealed, said first proportion being in the range of 10% to 60% of said roads, and wherein a second proportion of said roads have a maximum width in the range of 3 metres to 12 metres.

In some embodiments, the processing site is in the range of 500 m to 40 km from the blast site. In particular implementations, the processing site is 25 km or more from the blast site.

In some embodiments, the mining operation or system further includes a control centre coupled to said communications network, said control centre including a computer-implemented control station executing software to monitor and control operation of said fleet of autonomous material handling units.

In some embodiments, each small capacity haulage vehicle has a maximum payload capacity of 80 tonnes or less.

A second aspect of the present disclosure provides a mine site configured to yield a predefined average daily material throughput over a month using a fleet of autonomous small capacity haulage trucks having a predefined maximum payload size, said mine site comprising:

a wireless communications network for handling communication between each autonomous small capacity haulage truck and a remote control centre; and a network of roads, wherein a first proportion of said roads have a gradient in excess of 10%.

In some embodiments, a second proportion of the roads are sealed, the second proportion being in the range of 10% to 60% of the roads, and a third proportion of the roads have a maximum width in the range of 3 metres to 12 metres.

In some embodiments, the mine site further includes a processing site located remotely from a blast site within the mine site. In some implementations, the processing site is situated in the range of 500 m to 40 km or more from the blast site within the mine site. In some implementations, the processing site is situated in the range of 25 km or more from the blast site.

In some embodiments, the processing site and the blast site are coupled by the network of roads. In some embodiments, the network of roads does not include a materials rehandling station.

A third aspect of the present disclosure provides a method for extracting a predefined amount of blast material from a mine site within a predefined period, said method comprising the steps of:

blasting material from at least one blast site within said mine site; and utilising a fleet of autonomous small capacity haulage trucks to transport material from each said blast site to a processing site, wherein movement of said autonomous small capacity haulage trucks is controlled by control commands transmitted from a control centre.

In some embodiments, the mine site has a network of roads, wherein a first proportion of the roads are sealed, the first proportion being in the range of 10% to 60% of the roads, and wherein a second proportion of the roads have a maximum width in the range of 3 metres to 12 metres.

In some embodiments, the small capacity haulage trucks have a maximum capacity in the range of 10 tonne to 80 tonnes, or less than a predefined percentage of the predefined amount of blast material.

According to another aspect, the present disclosure provides an apparatus for implementing any one of the aforementioned methods.

Other aspects of the present disclosure are also provided.

BRIEF DESCRIPTION OF THE DRAWINGS

One or more embodiments of the present disclosure will now be described by way of specific example(s) with reference to the accompanying drawings, in which.

Method steps or features in the accompanying drawings that have the same reference numerals are to be considered to have the same function(s) or operation(s), unless the contrary intention is expressed or implied.

DETAILED DESCRIPTION

Figure 1:
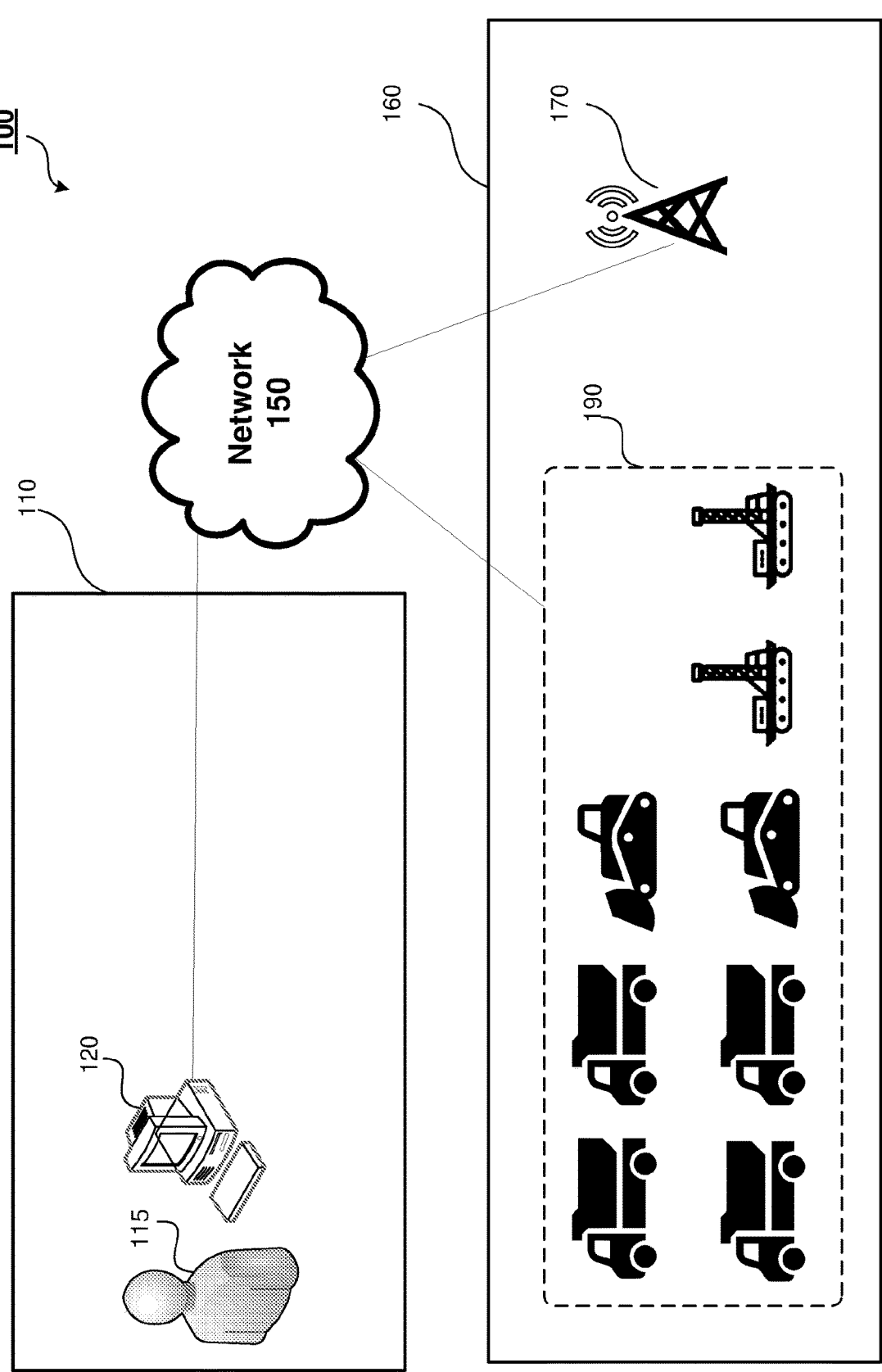
FIG. 1 is a system diagram of a mining operation in accordance with the present disclosure.

The present disclosure provides methods and systems for mining that utilise one or more autonomous material handling units. In particular, some embodiments of the methods and systems of the present disclosure utilise fleets of smaller equipment, such as autonomous haulage trucks, to move material around mine sites.

One aspect of the present disclosure relates to a mining operation or system that includes a mine site having a network of roads and a fleet of autonomous material handling units controlled by a control centre. Using smaller, autonomous material handling units enables greater flexibility and efficiencies in the mining operation. The autonomous material handling units may include, but are not limited to, loaders, haulage vehicles, drill rigs, trains, excavators, mobile crushers, and any combination thereof. Haulage vehicles may include, for example, haulage trucks, containers with continuous track propulsion, and the like. In embodiments in which the material handling units include haulage vehicles, the haulage vehicles have carrying capacities in the range of 10 tonne to 80 tonnes. In some embodiments, the haulage vehicles have maximum payload capacities in the range of 40 to 60 tonnes.

A mineral deposit is an aggregate of that mineral within an ore body in a higher concentration than is usual. For example, the minerals may form localised areas such as seams or discrete pockets, as in the case of iron ore and gold deposits, but not limited thereto. The material within an ore body that does not contain the mineral of interest is referred to as waste. When mining larger parcels of material, dilution occurs across ore and waste boundaries. Consequently, the volume of ore, being solid material from which a valuable metal or mineral can be extracted, relative to waste is reduced.

Ore body knowledge (OBK) is the integration of geological, mining, metallurgical, environmental, and economic information to create geological models for use in mining. Such models are used to identify rich deposits of minerals and to evaluate the ease and cost of mining deposits within a given area. Advanced OBK prior to blasting can be used to identify target areas of higher economic value, such as through higher mineral concentration, greater ease of access, or a combination thereof. For example, initial ore identification and grade estimation obtained using exploratory data and modelling can be updated using production data, such as measurement while drilling (MWD) data, blast cone sampling, hyperspectral imaging, and the like. More advanced geological maps enable the identification of specific areas of a mine to be targeted.

Smaller trucks allow for smaller benches as less room is required to manoeuvre smaller trucks relative to larger trucks. Smaller benches, combined with advanced OBK, can allow for more specific areas of a mine to be targeted. Smaller trucks can access those specific areas and obtain less dilute, or in other words more homogenous, payloads (e.g., payloads that are predominantly of one grade, such as high grade). Mining can therefore be more selective, load by load. The use of smaller benches, tighter blasts in targeted areas of a mine, and more selective payloads may result in the overall processing and output of the mine being a higher resolution than traditional surface mining using ultra-class machines.

Post-blast, there are also techniques that can be used to distinguish between blasted material of different types, for example different grades such as high grade and low grade or different material types. For example, hyperspectral imaging, or loading device (e.g., excavator, shovel) sensors can be utilised to analyse blasted material. Loading device sensors may utilise, for example, one or more of a Prompt Gamma Neutron Activation Analysis (PGNAA) sensor; a microwave sensor; an x-ray sensor; and a magnetic induction sensor. Such techniques can also be used to load trucks with blasted material of predominantly one grade.

Additionally, smaller benches and the use of smaller trucks can mean that smaller block sizes are feasible, which may also allow for more selective mining. Parcels of blasted material are referred to as blocks and block sizes depend on the size of the bench and the design of the blast. The quality of each block is classified based on the percentage of ore contained in the respective block. Block sizes may be for example, 10 m×10 m×10 m or 5 m×5 m×5 m or 2.5 m×2.5 m×2.5 m. In one example, a 10 m×10 m×10 m block that contains 40% ore is classified as relatively low grade. However, dividing such a block into 8 blocks of size 5 m×5 m×5 m may yield 4 blocks of 70% ore, 2 blocks of low grade, and 2 blocks of waste material.

Autonomous material handling units having maximum carrying capacities in the range of 80 tonnes or less are suited to increasing the recovery of ore from a mine site, as such relatively smaller vehicles are able to access smaller work spaces and carry less dilute loads of blasted material. As described above, smaller work spaces may be used to produce smaller blocks that can be sorted more granularly into different quality classifications, resulting in better ore recovery. Further still, autonomous material handling units having maximum carrying capacities in the range of 80 tonnes or less are cheaper to buy and cheaper to run, resulting in lower capital costs relative to massive machinery typically utilised at mine sites.

The control centre may be co-located with the mine site or located remotely from the mine site. The control centre includes one or more control stations that enable human controllers to monitor and control the operation of the autonomous material handling units. The control stations are implemented using a computer that includes a processor on which executes control software for sending and receiving information to and from the autonomous material handling units. The control software also provides a user interface for displaying current operating conditions to the human controllers and for receiving inputs from the human controllers.

The control stations communicate with the autonomous handling units via a communications network that includes a wireless communication link between each autonomous material handling unit and a set of wireless transmission towers located at the mine site. The wireless communication towers are coupled to the control stations via a communications network, that may include the Internet. In some embodiments, the communication coverage may not be over the whole area, but rather just at specific areas, such as loading/unloading or other operating areas. For example, a number of wireless transmission towers are located at one or more discrete points within a mine site to cover an area in which the autonomous material handling units operate. The communications network couples the transmission towers to the control stations via one or more wired or wireless communications links.

In some embodiments, some or all of the autonomous vehicles are electric powered vehicles or hybrid vehicles, wherein hybrid vehicles utilise a combination of electric motors and internal combustion engines. In some embodiments, some or all of the autonomous vehicles are powered using alternative fuels. Such alternative fuels may include, for example, but are not limited to, gaseous fuels (such as hydrogen, natural gas and propane), bio-diesel, bio-alcohols (such as ethanol, methanol, and butanol), vegetable oils, refuse-derived fuels, and the like. Haulage trucks in the range of 80 tonnes or less are well suited to being powered using electric motors, in contrast to internal combustion engines, or with hybrid engines that combine one or more electric motors with an internal combustion engine. The use of electric haulage trucks and other autonomous material handling units reduces carbon emissions.

In some embodiments, the mine site is a surface mine and a proportion of the network of roads are haul roads for transporting raw materials from a blast site within the mine site to a processing or waste dump site. In some implementations, a proportion of the network of roads are haul roads having gradients in the range of 10% to 20%.

In some embodiments, a proportion of the network of roads is sealed. In particular applications, the proportion of the network of roads that is sealed is in the order of 10% to 100%, and preferably in the range of 10% to 60%. Smaller haulage vehicles in the range of 80 tonnes or less have a higher maximum speed (typically in the range 80-100 km/h) than massive haulage trucks, which typically have a maximum speed in the range of 60 km/h (42 mph) and typically operate in the range of 40 km/h. Sealed roads enable such smaller haulage vehicles to travel quickly between two points, relative to the speeds generally travelled by massive haulage trucks on unsealed roads. Further, sealed roads require less maintenance than unsealed roads, which typically require regular watering and grading.

A materials rehandling station is a place where material is unloaded from a first vehicle and then reloaded to a second vehicle, in order to minimise the haulage distance for large haul trucks. When large haul trucks travel long distance, there is a significant risk of tyres overheating, with the potential for damaging the tyres. The use of relatively smaller haulage vehicles may obviate the need for materials rehandling stations. In some embodiments, the network of roads does not include a materials rehandling station for loading and reloading vehicles. In particular, in some embodiments there are no materials rehandling station between a blast site and a processing site.

In some embodiments, the processing site and the blast site are not co-located. Consequently, the processing site is remote from the blast site. The distance between the blast site and the processing site may be in the range of 500 m to 40 km or more, and is preferably in the range of 1 km to 30 km. In some implementations, the distance between the blast site and the processing site is 25 km or greater. Other materials processing stations, such as a high grade ore stockpile, may be present.

FIG. 1 is a schematic block diagram representation of a mining operation 100 in accordance with the present disclosure. In the example of FIG. 1, the mining operation relates to a mine site 160 that is serviced by a fleet of autonomous material handling units. The system 100 includes a remote control centre 110 for remotely operating control of the fleet of autonomous material handling units 190. The control centre 110 may be co-located with the mine site 160 or located remotely from the mine site 160. In the example of FIG. 1, the control centre 110 is located remotely from the mine site 160 and is in communication with the mine site via a communications network 150.

The remote control centre 100 includes a control station 120 that is accessed by a human controller 115 to monitor and control operation of the fleet of autonomous material handling units 190 at the mine site 160. Whilst the autonomous material handling units 190 are configured to operate autonomously, the control station 120 provides the human controller 115 to intervene with manual override of one or more controls associated with one or more of the autonomous material handling units 190 or to change settings in a control program that sends commands to control operation of the autonomous material handling units 190. Whilst the example of FIG. 1 shows a single control station 120, other embodiments may include control stations to allow contemporaneous access by multiple human controllers. In a large installation, different controllers utilise a set of control stations to monitor an allocated set of autonomous material handling units across one or more mine sites.

The control station 120 is coupled to the communications network 150. The communications network 150 may be implemented utilising one or more wired communications links, wireless communications links, or any combination thereof. In particular, the communications network 150 may include a local area network (LAN), a wide area network (WAN), a telecommunications network, or any combination thereof. A telecommunications network may include, but is not limited to, a telephony network, such as a Public Switch Telephony Network (PSTN) or a cellular mobile telephony network, the Internet, or any combination thereof.

Each of the autonomous material handling units in the fleet 190 is equipped with a wireless transceiver for coupling the respective autonomous material handling unit with the communications network 150. Each autonomous material handling unit in the fleet 190 may be coupled directly to the communications network 150 or via a network of one or more transmission towers 170 located at the mine site. In the example of FIG. 1, the fleet of autonomous material handling units 190 includes a combination of drill rigs, loaders (bulldozers), and haulage trucks. Other material handling units may equally be practised.

During operation, the control station 120 and autonomous material handling units 190 communicate with each other via the communications network 150. Each autonomous material handling unit is equipped with a geolocation device, such as a Global Positioning System (GPS) locator, so that the co-ordinates of each unit are known at any moment. The material handling units 190 are able to send information back to the control station 120 at the remote control centre 110, such as information about the location, speed and orientation of the respective material handling unit, as well as operating parameters, such as temperature, fluid levels, and the like.

Each autonomous material handling unit in the fleet 190 includes an onboard controller that is configured to control operation of that material handling unit. Such onboard controllers are implemented using a computing device and operations may include, for example, but are not limited to, the ability to turn the unit on and off, the ability to operate the unit in accordance with a received map or program, such as to steer or navigate along a programmed path.

In some embodiments, one or more of the autonomous material handling units is equipped with proximity sensors that detect the presence of an object within a predefined distance or range of the perimeter of that unit. In such embodiments, the onboard controller is optionally programmed to react to detection of an object within the predefined distance by stopping the unit, taking evasive action, and/or sending an alert to the control station 120 so that the controller 115 can take corrective action.

In some embodiments, the fleet of autonomous material handling units 190 includes a plurality of small capacity haulage trucks having load capacity in the range of 10 tonnes to 80 tonnes, with some embodiments utilising small capacity haulage trucks having a maximum payload capacity in the range of 40 to 60 tonnes. Such small capacity haulage trucks are significantly smaller than massive haulage trucks typically utilised at surface mines. For example, the Komatsu 980E-4 haulage trucks have a 369 tonne payload capacity and the Caterpillar 797 haulage trucks have a 364 tonne payload capacity.

Using a fleet of smaller haulage trucks requires a greater number of haulage trucks than used in a conventional mine site operated using massive haulage trucks. Consequently, the greater number of haulage trucks in motion can cause traffic congestion and conflicts within the mine site. However, smaller haulage trucks with load capacity in the range of 10 tonnes to 80 tonnes are significantly faster and more agile than massive haulage trucks, resulting in potentially higher closing speeds between haulage trucks operating in the same area of the mine site 160.

In order to control the operation of the fleet of autonomous material handling units, some embodiments of the control station 120 are equipped with network management controls to control the flow and operation of the material handling units within the mine site 160. Such network management controls may be implemented using software executing on a processor to monitor and control the flow of traffic of the material handling units within the mine site 160.

Depending on the implementation, the network management controls are programmed with operating parameters associated with each of the material handling units, including but not limited to maximum speed, braking distance for each speed, maximum payloads, and the like. The network management controls utilise the operating parameters and current positions of the material handling units to determine traffic flows of the material handling units and the effect collision avoidance. For example, network management controls can be utilised to control the speed of two autonomous material handling units that are both approaching the same point on the mine site 160, such that both units pass the point safely while minimising braking and acceleration that increases wear and tear on the vehicles and increases fuel usage.

As described above, current mining operations utilise massive mining-specific equipment to excavate, load, and move material. Such massive equipment is difficult and expensive to maintain and operate, requiring long lead times to acquire new equipment and specialist infrastructure to operate. Extremely large mining machines occupy large footprints, necessitating wide roads that have shallow gradients, typically less than 10%, and requiring large areas within which to operate, turn around, and manoeuvre.

The strip ratio of a mine is a measurement of the amount of waste (also commonly referred to as overburden) that must be removed from a mine site to obtain a given ore quantity. The strip ratio is a direct indication of how much waste material is mined per unit of ore. Wide roads with shallow gradients result in a high strip ratio, requiring a large amount of waste material to be extracted for a given quantity of valuable ore. This is because wide roads create a shallow final wall angle, so it is necessary to cut back further to reach/uncover a desired region of material. The steeper the average slope is, the less dirt that needs to be dug out. The average wall angle includes roads and the bench to bench wall slope. Steeper ramps create overall shorter roads to get to a certain depth within a mine site. Thus, the width of the roads, the size of the benches, and the gradient of the ramps all impact the strip ratio for a given mine site or portion of a mine site. Narrower roads with steeper ramps produce a lower strip ratio. Further, using a 5 m bench design allows for better moulding of the mine along the ore body than using 10 m benches.

Extremely large mining machines are generally custom ordered in that such machines are generally built to order. Further, such extremely large mining machines are difficult to manufacture, involving significant lead times and capital expense. Consequently, it is difficult to adjust the size of fleets of mining equipment in response to changes in mining conditions, as ordering and commissioning new machinery takes a long time and requires advance budget planning. Consideration must also be given to the time and costs to recruit and train personnel to operate and maintain any increases in such extremely large machines. Given the capital cost associated with such extremely large machines, it is important that those machines are in operation as much as possible.

The use of smaller haulage trucks has many impacts on the mining environment. Smaller trucks and machines are cheaper to purchase, operate, and maintain. Spare parts are more readily available, both in terms of quantity and the ability to be transported. Servicing or repairing a single small truck has less impact on a large fleet of small trucks than repairing a single large truck has on a small fleet of large trucks. Servicing of smaller trucks is often able to be performed by auto mechanics with a standard level of skill, rather than the specialist skills required to maintain massive equipment. Purchase costs of smaller vehicles are considerably less than the large capital expenditure associated with massive mining vehicles. Consequently, fleet sizes of smaller vehicles can be changed relatively quickly, enabling mining operations to adapt to changing demands, such as increased or decreased output.

Typical bench sizes used in mine sites operating typical, massive machines are generally at least 50 m long, with benches often in the range of many hundreds of metres long with a width of at least 70 m. Smaller trucks can use narrower roads and negotiate steeper gradients. A direct consequence of this is that smaller benches can be used, with heights in the range of 5 m-25 m, preferably 5 m, and widths in the order of 20 m-60 m, such as around 50 m, to enable the smaller trucks and associated machinery to operate and manoeuvre safely. In some embodiments, even smaller bench heights in the range 2.5-5 m are envisioned. Bench widths of 50 m provide sufficient space to operate smaller machinery. Blast models can be denser, yielding tighter fragmentation. Consequently, using smaller trucks can improve the strip ratio, with less overburden mined to obtain a quantum of ore. When using massive machinery, a lot of valuable ore is typically left in the mine site, such as in the mine floor. Smaller machinery, with tighter fragmentation from different blast models, can access ore that would otherwise be inaccessible to larger machinery.

Operating a mine site with a fleet of smaller haulage trucks enables the mine site to be configured with narrower, steeper roads. Such a configuration results in a mine site having a greater yield relative to a mine site operated with massive equipment and the associated wide roads with shallow gradients.

In some embodiments, a mine site with a fleet of smaller haulage trucks operates with a smaller mining unit. That is, blasts are designed to produce smaller fragments of blast material. Smaller fragments of blast material are more readily examined to determine the composition of that blast material. In alternative embodiments, a mine site operating with a fleet of smaller haulage trucks utilises a set of mobile crushers to crush larger blast material into a size suitable for loading into the smaller capacity haulage trucks. Crushing material at the blast site into smaller fragments again provides greater insight into the composition of the blasted material. In these embodiments, information about the mine and its contents are more granular (i.e., providing a higher resolution of the content of the mine) at an earlier time in the mining process, which enables a mine operator to make more informed decisions about the composition of that mine and the mine operator is able to mine more selectively.

Information about the mine and its contents may be obtained by using one or more sensors to inspect material at one or more points in the mining process, such as at a crusher. Such sensors may include, for example, but are not limited to, LiDAR-Inertial 3D Plane SLAM (LIPS) system, x-ray, spectral cameras, photographic and video cameras, and any combination thereof. The sensors may be supplemented with processors performing analysis of the scanned results to inform decision making relation to operation of the mine, such as where to move a load, when to stop loading a truck, or which truck to load with which quality of blasted material. The processing may include, for example, image processing and artificial intelligence (AI) processing, and may be performed on a processor located on, or in communication with, any piece of mining machinery, such as a crusher. In some embodiments, processing is performed on a processor co-located with a crusher. In some embodiments, processing is performed on a remote computing device in communication with a crusher or other mining site equipment.

Larger blasts require excavators to load massive haulage trucks. Such excavators are relatively static and utilise large swing arms to collect and move material. In contrast, loaders can be used to collect and move the material from smaller blasts with tighter fragmentation. Such loaders are manoeuvrable and are well suited to loading smaller haulage trucks.

Using narrow roads also makes it more cost effective to seal some or all of the access roads approaching and within a mine site, which obviates the need to wet and grade roads, as is presently required for the unsealed roads. Sealed roads are able to be used at all times, including during wet conditions, and require less regular maintenance. In contrast, unsealed roads become slippery when exposed to rainfall, particularly the ramps within a mine site. Consequently, unsealed roads may be taken out of use when slippery, halting mining.

In some embodiments, a mine site is provided that includes a network of roads, wherein a proportion of the roads have a maximum width in the range of 3 metres to 12 metres. Particular embodiments have a proportion of roads with a maximum width in the range of 3 metres to 12 metres. Some embodiments are not only narrower, but also built to carry vehicles having a maximum carrying capacity of 80 tonnes or less. Narrower roads built for significantly lighter trucks are quicker and cheaper to build than wide roads built for ultra-class vehicles. Further, narrower roads used in conjunction with relatively small autonomous material handling units, such as haulage vehicles having a maximum carrying capacity of 80 tonnes or less, enable better recovery of ore from a mine site or part of a mine site, resulting in a better strip ratio for that area.

Smaller trucks are faster than massive, ultra-class mining equipment. Whilst smaller trucks cannot carry loads as large as massive haulage trucks, the smaller trucks can be loaded and unloaded more quickly and can move from one point to another more quickly than massive haulage trucks.

Figure 2:
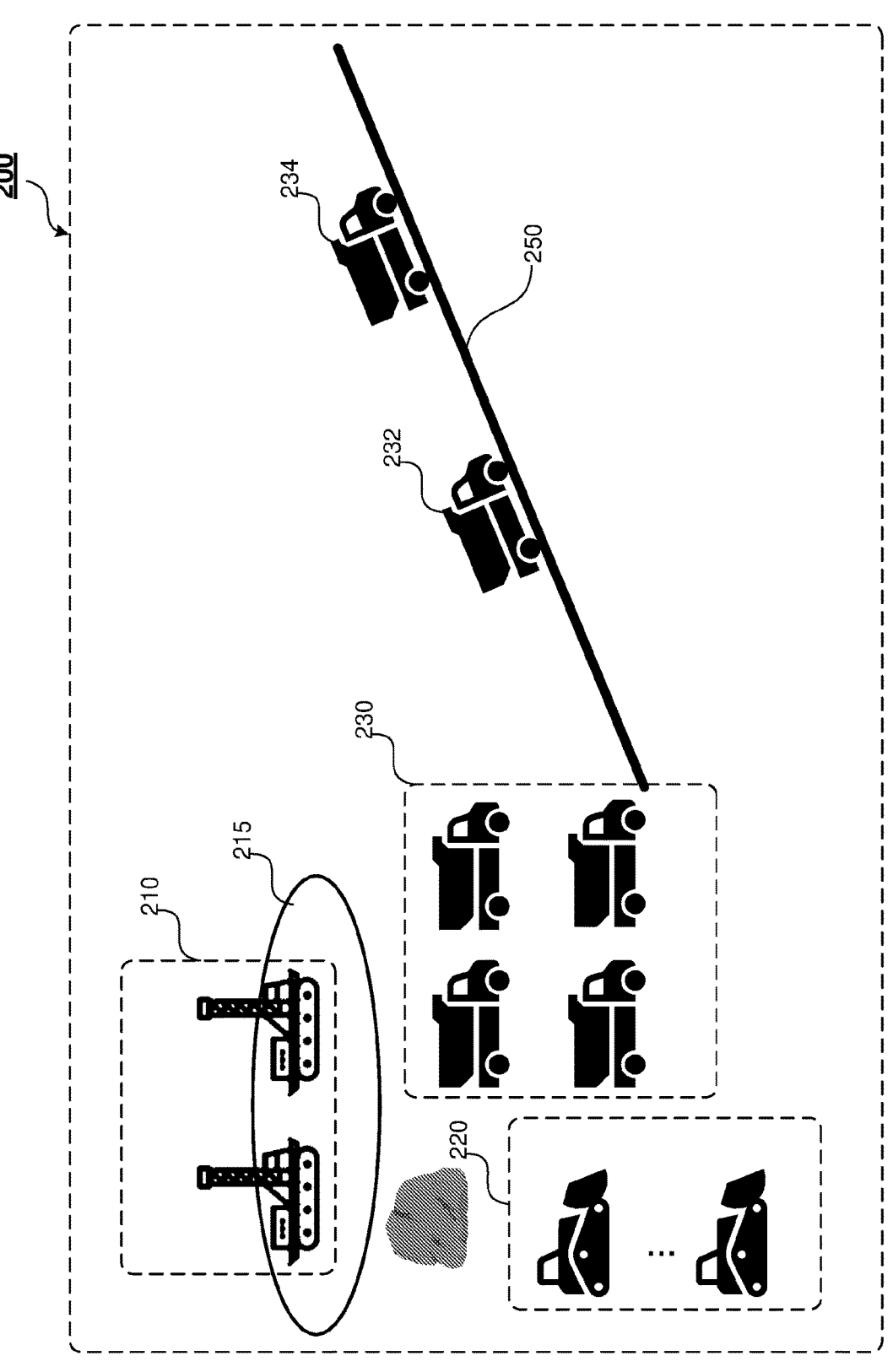
FIG. 2 is a schematic representation of a mine site on which one or more embodiments of the present disclosure may be practised.

FIG. 2 is a schematic representation of a portion of a mine site 200 having a bench 215 on which a set of drill rigs 210 is operating. The drill rigs 210 drill blast holes, which are subsequently filled with explosives to blast the bench 215 into blast material of a predetermined size. A set of loaders 220 loads the blasted material from the bench 215 into a set of autonomous small haulage vehicles 230. Depending on the implementation, the drill rigs 210 and/or the loaders 220 may be human operated or autonomous or a combination thereof. Once the small haulage vehicles have been loaded with blasted material, the small vehicles travel up a haul road 250 to deliver the blasted material for further processing or to a waste dump.

In the example of FIG. 2, small haulage vehicles 232 and 234 are loaded with blasted material and are travelling on the haul road 250. As the small haulage vehicles 230, 232, 234 have payload capacities in the range of 1 tonne to 30 tonne, those vehicles 203, 232, 234 are able to negotiate roads with steep gradients in excess of 10%, particularly in the range of 10% to 16%. Roads with steeper gradients require less excavation and provide shorter travel distances.

As the small haulage vehicles 230, 232, 234 are significantly smaller than massive haulage trucks and inflict significantly less wear on the road surface, it is economical to seal a proportion of roads in the mine site 200 to be used by the fleet of small haulage trucks. Sealing roads allows the small haulage vehicles 230, 232, 234 to travel at higher speeds, such as 80 km/h to 100 km/h or more, reducing the time taken to move blasted material from the bench 215 to subsequent processing or waste sites. In contrast, ultra-class haul trucks have maximum speeds in the order of 60 km/h, but more typically travel in the range of 40 km/h. Further, small haulage vehicles accelerate faster and more efficiently than ultra-class trucks and also brake faster and more efficiently than ultra-class trucks. Accordingly, the mine site 200 is optionally configured with portions of haul roads 250 having gradients in excess of 10%, and having portions of haul roads 250 sealed.

The flexibility associated with smaller trucks provides opportunities not presently available through the use of massive haulage trucks. Smaller trucks can utilise public roads which improves accessibility. Smaller trucks can utilise conventional infrastructure and may not need customised infrastructure (e.g. maintenance bays and re-fuelling facilities). Smaller trucks travelling on sealed roads are able to travel at significantly faster speeds than large haulage trucks. As a consequence, mine infrastructure, such as crushers or rail haulage, may be located further from the mine floor. Further, small autonomous vehicles can use more of the road surface, as large mining vehicles place huge stress on road edges.

Each load of a massive haulage truck represents a significant load, both in terms of the volume of the carrying capacity of the haulage truck and the time taken to load and transport that load. Consequently, such haulage trucks are loaded to maximum capacity for each run with whatever material has been blasted and sorting and processing of the blasted material occurs downstream.

Smaller trucks have a much smaller carrying capacity and are more manoeuvrable. Consequently, a fleet of small trucks can be utilised to transport different types of blasted material, based on size, composition, or a combination thereof. As smaller capacity haulage vehicles have significantly less payload capacity than massive mining vehicles, there is less or mixing of mining materials having different grades or properties in each load of a small capacity haulage vehicle. That is, each load in a small capacity haulage truck is more homogenous than a load from a large capacity haulage truck. Smaller trucks can be designated different roles, such that a first set of trucks is loaded with blasted material having a higher ore content and a second set of trucks is loaded with blasted material having a higher waste content.

Sorting blast material at the blast site provides improved efficiencies. Loading of a truck can stop when a change in composition of the material to be loaded is detected, so that waste material can be re-directed to another truck. This avoids dilution of the current payload of the truck. Further, smaller trucks have smaller carrying capacities, so there is less penalty to send trucks without fully loading the truck each time.

In the example of FIG. 2, the loaders 220 optionally load the set of small haulage vehicles 230 based on the type of blasted material that is being moved. Thus, the loaders 220 can sort blasted material into wasted material and ore and then load the fleet of vehicles 230 with one of the sorted material types.

In some embodiments, a mine site operated with autonomous, small haulage trucks is also equipped with mobile crushers. The mobile crushers are able to be positioned at a blast site after blasting has occurred to crush the blasted material into a size that is more suitable for the smaller haulage trucks.

Crushing the blasted material at the blast site enables the composition of the blast material to be determined at an earlier point of the processing, such that material can be sorted into different trucks or trucks can be sent to different processing sites, based on the composition of the blast material that is being hauled. Further, knowing the composition of the blast material at an earlier time enables subsequent blasting operations to be more efficient. In some circumstances, the blast pattern or explosive is changed based on the most recent blast. In other circumstances, a different area of the mine site is selected for a subsequent blast based on poor composition of a most recent blast.

In a mine site that utilises a fleet of autonomous, small haulage vehicles, there may be a consequential increased need to manage the flow of traffic around a mine site. Each autonomous vehicle is associated with a Global Positioning System (GPS) device that transmits a present location of the respective vehicle, via satellite, to a central operations centre. Some embodiments utilise control software at the operations centre to control movement of vehicles relative to one another, in accordance with predefined minimum passing distances. Such control software also defines minimum passing distances between a vehicle and other features, such as obstacles, road edges, kerbs, guttering, loaders, markers, and the like.

Using a fleet of smaller, autonomous vehicles will result in an increase in the number of traffic movements relative to a mine site operating traditional, massive equipment. Some embodiments provide a mine site with increased number of slip roads and/or traffic controls in order to manage the movement of vehicles within the site. Such traffic controls may include visual controls, including traffic lights, as well as network controls from a control centre that manage the speeds and directions of autonomous vehicles on the mine site. In some embodiments, vehicle controls, either on the vehicles or effected through controls sent from a control centre, govern the speeds of autonomous vehicles as those vehicles approach intersections, objects, or other vehicles.

Some embodiments utilise a network of wireless transmission towers to communicate with the autonomous vehicles using radiofrequency (RF) transmissions. Wireless transmitters in the autonomous vehicles communicate with a control centre, via the network of transmission towers.

In some embodiments, some or all of the autonomous vehicles are equipped with proximity detectors that detect the presence of objects within a predefined distance of a perimeter of the vehicle. In such vehicles, vehicle control software executing on a processor installed in such vehicles is programmed to activate the brakes of the vehicle or to turn the wheels of the vehicle in order to prevent a collision with a detected object. In some embodiments, the detection of an object within a predefined distance, or range, triggers an alert, such that the vehicle control software transmits a collision alert message to the control centre. On receipt of such a collision alert message, the control centre generates a visual and/or audible alert to attract the attention of an operator in charge of activities in the relevant area of the mine site at which the collision alert message was generated.

Smaller trucks can utilise existing roads constructed for existing mining vehicles. In addition, smaller trucks are capable of travelling at higher speeds and are more agile. Consequently, narrower roads having bends of tighter radii and with steeper gradients may be used. Further, using smaller vehicles enables the use of conventional vehicle service bays, in contrast to the customised mining vehicle service bays required by massive machines.

The utilisation of smaller vehicles enables satellite deposits of ore to be mined in an economical manner.

Some embodiments provide a mine site that utilises a fleet or one or more trucks, each truck having a payload in the range of 10 tonnes to 80 tonnes, and preferably in the range of 40 tonnes to 60 tonnes to achieve a total daily material throughput of approximately 50,000 tonnes to 500,000 tonnes.

In some embodiments, each haulage truck has a maximum payload capacity corresponding to a predefined percentage of a predefined average daily material throughput over a month. In some embodiments, the predefined percentage is in the range of 0.01% to 0.05%, and preferably in the range of 0.015% to 0.035%.

According to the present disclosure, a method for moving material in a mine site utilises a plurality of autonomous material handling units. The material handling units may include one or more loaders, crushers, haulage trucks, trains, and any combination thereof. Each autonomous material handling unit includes a wireless transceiver for communication with a control centre. In some implementations, the autonomous material handling units communicate wirelessly among each other. In some implementations, the control centre sends control signals to the autonomous material handling units to control activities of the autonomous material handling units. Such activities can include, for example, but are not limited, to loading material, moving, stopping, and unloading material.

Some embodiments provide a mine site having a road network, wherein a portion of roads within the road network have a gradient in the range of 10% to 20%, and preferably in the range of 10% to 14%.

Some embodiments provide a mine site having a network of roads, wherein 10% to 60% of those roads are sealed roads.

Further embodiments relate to one or more methods of designing a bench in a surface mine, based on an identified area of interest within the mine. In some embodiments, the area of interest is identified through one or more of: a geological model of the mine; MWD data from existing operations within the mine; exploratory drillings within the mine; and scanning of the mine.

Once the area of interest has been identified, the methods design a bench to retrieve material from that area, wherein the design may include one or more of size and location of the bench, and the size and location of at least one ramp to access the bench. The size of the bench may include, for example, one or more of the height, width, and length of the bench. The size and location of each ramp may include, for example, one or more of the length, gradient, and width of the respective ramp, as well as the start and end positions of the ramp. Such methods enable the design of benches within a mine to target specific ore deposits, such as particularly high grade ore deposits.

Design of the bench may also include dimensions of the blocks to be produced by blasting the bench. Such block sizes may have a volume of less than 1000 m³ (e.g., 10 m×10 m×10 m). For example, the dimensions of suitable block sizes may be 5 m×5 m×5 m or 2.5 m×2.5 m×2.5 m. Further, design of the bench may also include blast design parameters. Blast design parameters may include, for example, the number of blast holes, the location of the blast holes, the diameter of the blast holes, the depth of the blast holes, the type of explosive to be used, and the volume of explosive to be used in each of the blast holes.

The methods of designing such benches may be utilised in methods of improving a mining stockpile, wherein the methods of improving a mining stockpile identify an area of interest, design a bench for retrieving material from that area of interest, blast the bench, and then retrieve the blasted material. In such methods of improving a mining stockpile, multiple areas of interest within a mine may be identified, with benches designed for the respective areas of interest. This is a form of more targeted mining, in which smaller benches are designed for specific areas of interest to extract material from particular ore sites, in contrast to traditional mining in which a whole mine site is blasted to extract material, which yields comparatively poor yield ratios. Smaller block sizes allow for greater selectively and less dilution, as it would not be as uneconomical to load a smaller truck with predominantly one grade, even if only partially filled. In contrast, ultra-class trucks need to be fully filled to be economical.

In some implementations, the bench is small relative to bench sizes utilised for ultra-class vehicles, with widths of the bench being in the range of 20 m to 60 m (and preferably in the range of 50 m), and the blasted material is removed using vehicles having maximum carrying capacities in the range of 80 tonnes or less. Smaller bench widths enable the use of an overall steeper mine angle, which can enable less overburden and deeper mines.

In some embodiments, autonomous vehicles are utilised to retrieve the blasted materials. Such autonomous vehicles may include, for example, haulage trucks, mobile crushers, and loaders. In some implementations, the haulage trucks are relatively small, having maximum carrying capacities in the order of 80 tonnes or less. As described above, such vehicles are able to operate with narrower roads having steeper gradients than ultra-class haulage trucks. Depending on the implementation, the autonomous vehicles are controlled by one or more operators in conjunction with a control system in communication with the autonomous vehicles.

In some embodiments, identification of an area of interest is based on advanced ore grade information. Initial ore grade information may be obtained through exploration data. Such exploration data is obtained through exploratory drilling, geological modelling, and the like. The initial ore grade information is updated to provide pre-blasting ore grade information based on one or more of: OBK through MWD data obtained from the mining site or a nearby site, blast cone/drill chip sampling, hyperspectral scanning, and the like.

The blasted material is optionally sorted into classification grades. Sorted material can then be loaded into different haulage trucks. For example, if the blasted material is simply sorted into high grade and low grade ore, then high grade ore is loaded into a first truck and low grade ore is loaded into a second truck. This allows the high grade ore and low grade ore to be directed to different stockpiles for different processing. Sorting of the blasted material may be based, for example, on hyperspectral imaging, magnetic induction, or loading device (e.g., excavator, shovel) sensors for analysing blasted material. Loading device sensors may utilise, for example, one or more of a Prompt Gamma Neutron Activation Analysis (PGNAA) sensor; a microwave sensor; an x ray sensor; and a magnetic induction sensor.

Figure 3:
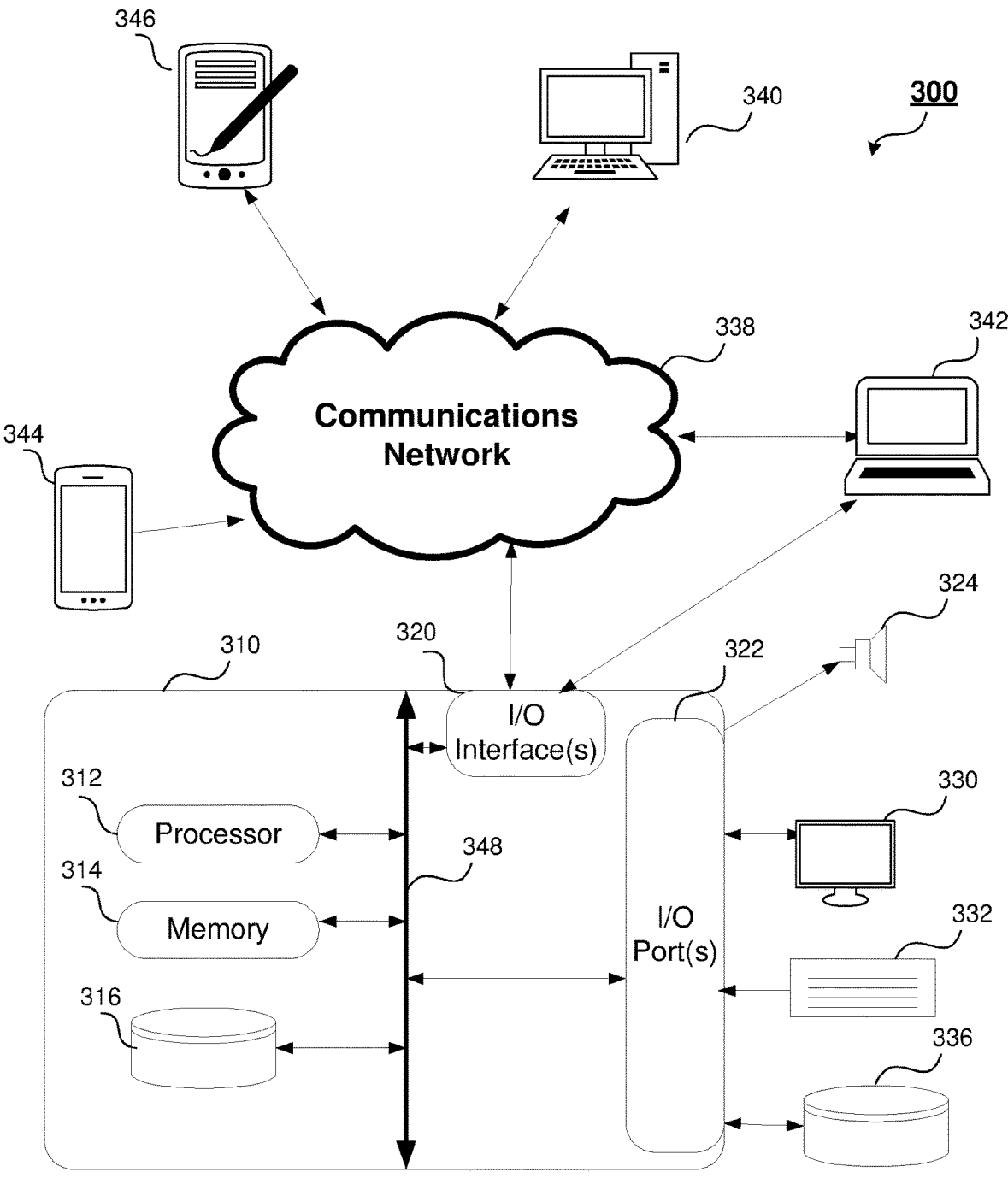
FIG. 3 is a schematic block diagram representation of a system that includes a general purpose computer on which one or more embodiments of the present disclosure may be practised.

The mining operation control stations and onboard vehicle controllers of the present disclosure may be practised using one or more computing devices, such as a general purpose computer, programmable logic controller, embedded computer, or computer server programmed and adapted to function in an improved manner. FIG. 3 is a schematic block diagram representation of a system 300 that includes a general purpose computer 310. The general purpose computer 310 includes a plurality of components, including: a processor 312, a memory 314, a storage medium 316, input/output (I/O) interfaces 320, and input/output (I/O) ports 322. Components of the general purpose computer 310 generally communicate with each other using one or more buses 348.

The memory 314 may be implemented using Random Access Memory (RAM), Read Only Memory (ROM), or a combination thereof. The storage medium 316 may be implemented as one or more of a hard disk drive, a solid state "flash" drive, an optical disk drive, or other storage means. The storage medium 316 may be utilised to store one or more computer programs, including an operating system, software applications, and data.

In one mode of operation, instructions from one or more computer programs stored in the storage medium 316 are loaded into the memory 314 via the bus 348. Instructions loaded into the memory 314 are then made available via the bus 348 or other means for execution by the processor 312 to implement a mode of operation in accordance with the executed instructions. The computer programs may include network management controls, controls for autonomous vehicles, and onboard vehicle controls.

One or more peripheral devices may be coupled to the general purpose computer 310 via the I/O ports 322. In the example of FIG. 3, the general purpose computer 310 is coupled to each of a speaker 324, a display device 330, an input device 332, and an external storage medium 336. The speaker 324 may be implemented using one or more speakers, internal to the computing device 310 or external to the computing device 310, such as in a stereo or surround sound system. In the example in which the general purpose computer 310 is utilised to implement a control system in accordance with FIG. 1, one or more peripheral devices may relate to the user input devices and alert systems.

The display device 330 may be a computer monitor, such as a cathode ray tube screen, plasma screen, liquid crystal display (LCD) screen, or Light Emitting Diode (LED) display screen. The display 330 may receive information from the computer 310 in a conventional manner, wherein the information is presented on the display device 330 for viewing by a user. The display device 330 may optionally be implemented using a touch screen to enable a user to provide input to the general purpose computer 310. The touch screen may be, for example, a capacitive touch screen, a resistive touchscreen, a surface acoustic wave touchscreen, or the like. In the example in which the general purpose computer 310 is utilised to implement the control station 120 of FIG. 1, the display device 310 may display a user interface for receiving inputs from the controller 115 and displaying information relating to the operation and control of the fleet of autonomous material handling units 190 on the mine site 160.

The input device 332 may be a keyboard, a mouse, a stylus, drawing tablet, or any combination thereof, for receiving input from a user. The external storage medium 336 may include an external hard disk drive (HDD), an optical drive, a flash drive, solid state drive (SSD), or any combination thereof and may be implemented as a single instance or multiple instances of any one or more of those devices. For example, the external storage medium 336 may be implemented as an array of hard disk drives.

The I/O interfaces 320 facilitate the exchange of information between the general purpose computing device 310 and other computing devices. The I/O interfaces may be implemented using an internal or external modem, an Ethernet connection, or the like, to enable coupling to a transmission medium. In the example of FIG. 3, the I/O interfaces 322 are coupled to a communications network 338 and directly to a computing device 342. The computing device 342 is shown as a personal computer, but may be equally be practised using a smartphone, laptop, or a tablet device. Direct communication between the general purpose computer 310 and the computing device 342 may be implemented using a wireless or wired transmission link.

The communications network 338 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The general purpose computer 310 is able to communicate via the communications network 338 to other computing devices connected to the communications network 338, such as the mobile telephone handset 344, the touchscreen smartphone 346, the personal computer 340, and the computing device 342.

One or more instances of the general purpose computer 310 may be utilised to implement a control station or onboard controller in accordance with the present disclosure. In such an embodiment, the memory 314 and storage 316 are utilised to store data relating to the configuration and operating parameters of a fleet of autonomous material handling units 190 at one or more mine sites 160. Software for implementing the control system is stored in one or both of the memory 314 and storage 316 for execution on the processor 312.

INDUSTRIAL APPLICABILITY

The arrangements described are applicable to the mining and transport industries.

The foregoing describes only some embodiments of the present invention, and modifications and/or changes can be made thereto without departing from the scope and spirit of the invention, the embodiments being illustrative and not restrictive.

Reference throughout this specification to "one embodiment", "an embodiment," "some embodiments", or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

While some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

Note that when a method is described that includes several elements, e.g., several steps, no ordering of such elements, e.g., of such steps, is implied, unless specifically stated.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

Similarly, it is to be noticed that the term coupled should not be interpreted as being limitative to direct connections only. The terms "coupled" and "connected," along with their derivatives, may be used. It should be understood that these terms are not intended as synonyms for each other but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A". "Coupled" may mean that two or more elements are either in direct physical or electrical contact, or that two or more elements are not in direct contact with each other but yet still co-operate or interact with each other.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

We claim:

1. A mining operation comprising:
a surface mine site including a processing site situated at least 25 km from a blast site within said mine site, said processing site and said blast site being coupled by a network of roads, wherein a first proportion of said roads are sealed, said first proportion being in the range of 10% to 60% of said roads, and wherein a second proportion of said roads have a maximum width in the range of 3 metres to 12 metres; and
a fleet of autonomous material handling units located at said surface mine site, each autonomous material handling unit including a wireless transceiver for coupling to a communications network,
wherein said autonomous material handling units include a plurality of small capacity haulage vehicles, each small capacity haulage vehicle having a maximum payload capacity of 80 tonnes or less, and
further wherein said autonomous material handling units are configured to be controlled by control commands transmitted from a control centre via said communications network.

2. The mining operation according to claim 1, further comprising:
said control centre coupled to said communications network, said control centre including a computer-implemented control station executing software to monitor and control operation of said fleet of autonomous material handling units.

3. The mining operation according to claim 2, wherein said control station includes network management controls to control movement of said fleet of autonomous material handling units.

4. The mining operation according to claim 1, wherein each small capacity haulage vehicle has a payload capacity in the range of 1 tonne to 30 tonnes or 40 tonnes to 60 tonnes.

5. The mining operation according to claim 1, wherein each small capacity haulage vehicle has a payload capacity corresponding to a predefined an average daily material throughput over a month of the mine site.

6. The mining operation according to claim 5, wherein said predefined percentage is in the range of 0.01% to 0.05%.

7. The mining operation according to claim 1, wherein said autonomous material handling units are selected from the group consisting of: loaders, drill rigs, mobile crushers, haulage trucks, and trains.

8. The mining operation according to claim 1, wherein at least one of said autonomous material handling units is electric powered or is a hybrid vehicle equipped with an electric motor and an internal combustion engine.

9. The mining operation according to claim 1, wherein a third proportion of said roads have a gradient in excess of 10%.

10. The mining operation according to claim 1, further comprising:

at least one loader for loading said small capacity haulage vehicles at a blast site within said mine site, wherein said small capacity haulage vehicles are assigned a blast material type to transport, said blast material types including waste material and ore.

11. A mine site configured to yield a predefined average daily material throughput over a month using a fleet of autonomous small capacity haulage trucks having a predefined maximum payload size, said mine site comprising:

a wireless communications network for handling communication between each autonomous small capacity haulage truck and a remote control centre;

a network of roads, wherein a first proportion of said roads have an average gradient in excess of 10%, wherein a second proportion of said roads are sealed, said second proportion being in the range of 10% to 60% of said roads, and wherein a third proportion of said roads have a maximum width in the range of 3 metres to 12 metres; and a processing site situated at least 25 km from a blast site within said mine site, wherein said processing site and said blast site are coupled by said network of roads and further wherein said network of roads does not include a materials rehandling station.

12. The mine site according to claim 11, wherein each small capacity haulage truck has a maximum payload capacity of less than or equal to 80 tonnes.

13. The mine site according to claim 11, wherein each small capacity haulage truck has a maximum payload capacity corresponding to a predefined percentage of said predefined average daily material throughput over a month.

14. The mine site according to claim 13, wherein said predefined percentage is in the range of 0.01% to 0.05%.

15. The mine site according to claim 11, wherein said mine site utilises a plurality of mobile crushers to process blasted material at one or more blast sites within the mine site.

16. The mine site according to claim 11, wherein said mine site includes an ore processing centre and said network of roads includes a plurality of roads coupling said ore processing centre to a plurality of blasting sites within said mine site.

17. A method for extracting a predefined amount of blast material from a mine site within a predefined period, said mine site having a network of roads, wherein a first proportion of said roads are sealed, said first proportion being in the range of 10% to 60% of said roads, and wherein a second proportion of said roads have a maximum width in the range of 3 metres to 12 metres, said method comprising the steps of:

blasting material from at least one blast site within said mine site; and utilising a fleet of autonomous small capacity haulage trucks to transport material from each said blast site to a processing site, wherein said processing site is one of an ore processing site or a waste dump, wherein said small capacity haulage trucks have a maximum capacity in the range of 10 tonne to 80 tonnes or less than a predefined percentage of said predefined amount of blast material, and further wherein movement of said autonomous small capacity haulage trucks is controlled by control commands transmitted from a control centre.

18. The method according to claim 17, comprising the steps of:

using small capacity loaders to collect blast material from each blast site and load said autonomous small capacity haulage trucks, wherein said small capacity loaders have a maximum bucket capacity of less than 20 $m^3$.

19. The method according to claim 17, further comprising the step of:

forming stockpiles of said blasted material based on material composition prior to loading into said small capacity haulage trucks.

20. The method according to claim 17, wherein said blasting of material from said at least one blast site is performed to yield a fragmentation size of less than 100 cm, suitable for transport in said small capacity haulage trucks.

* * * * *